United States Patent
Keeton

(10) Patent No.: US 10,401,712 B2
(45) Date of Patent: Sep. 3, 2019

(54) MULTI-CAMERA SUPPORT BRACKET

(71) Applicant: Thomas George Keeton, Seaford, DE (US)

(72) Inventor: Thomas George Keeton, Seaford, DE (US)

( * ) Notice: Subject to any disclaimer, the term of this patent is extended or adjusted under 35 U.S.C. 154(b) by 0 days.

(21) Appl. No.: 15/859,080

(22) Filed: Dec. 29, 2017

(65) Prior Publication Data

US 2018/0329279 A1    Nov. 15, 2018

Related U.S. Application Data

(60) Provisional application No. 62/504,200, filed on May 10, 2017.

(51) Int. Cl.
| | | |
|---|---|---|
| *G03B 17/56* | (2006.01) | |
| *F16M 13/02* | (2006.01) | |
| *F16M 11/04* | (2006.01) | |

(52) U.S. Cl.
CPC ........... *G03B 17/561* (2013.01); *F16M 11/04* (2013.01); *F16M 13/022* (2013.01); *F16M 2200/06* (2013.01)

(58) Field of Classification Search
None
See application file for complete search history.

(56) References Cited

U.S. PATENT DOCUMENTS

| | | | | |
|---|---|---|---|---|
| 4,272,177 A  * | 6/1981 | Ottenheimer | .......... | F16M 11/08 396/423 |
| 4,514,067 A | 4/1985 | Gallegos | | |
| 4,754,295 A  * | 6/1988 | Scott | ...................... | G03B 15/05 396/180 |
| 7,970,276 B1 * | 6/2011 | Routhier | ................ | F16M 11/32 396/325 |
| 2011/0129210 A1* | 6/2011 | McGucken | ............. | F16M 13/02 396/422 |
| 2015/0341617 A1 * | 11/2015 | Cole | ..................... | G03B 17/561 348/36 |
| 2017/0054965 A1* | 2/2017 | Raab | ....................... | G01C 11/02 |
| 2018/0262692 A1* | 9/2018 | Glasz | ...................... | H04N 5/247 |

* cited by examiner

*Primary Examiner* — Clayton E. LaBalle
*Assistant Examiner* — Dennis Hancock
(74) *Attorney, Agent, or Firm* — Katten Muchin Rosenman LLP

(57) ABSTRACT

A dual camera support bracket that includes a mounting device is described. The described mounting device is capable of positioning, securing, and protecting at least one camera. The mounting device allows the user to operate two cameras substantially simultaneously. In embodiments, the mounting device is a generally ridged mounting frame as well as a mounting arm. The mounting frame may include a substantially closed loop having an upper portion, lower portion, and two opposing side portions, and in which the mounting frame includes mounting holes arranged to mount a first camera within the interior of the mounting frame. The mounting arm may be configured to attach to the mounting frame and provide an attachment point for a second camera.

14 Claims, 17 Drawing Sheets

MULTI-CAMERA SUPPORT BRACKET

CROSS REFERENCE TO RELATED APPLICATIONS

This application claims the benefit of U.S. Provisional Application Ser. No. 62/504,200 filed May 10, 2017. Applicant incorporates by reference herein Application Ser. No. 62/504,200 in its entirety.

FIELD

Embodiments described herein relate to camera support brackets and mounting devices. More particularly, the described embodiments relates to a mounting device that is capable of positioning, securing, and protecting mounted cameras as well as allowing the user to capture images and/or video using two cameras substantially simultaneously.

BACKGROUND

Using multiple cameras can be a difficult and damaging task as the user quickly switches between the cameras. While multiple cameras may be traditionally hung around the user's neck, the cameras are likely to strike one another, causing damage to the cameras and discomfort to the user. Additionally, the user must keep switching between the cameras as the situation and conditions of the photo shoot change. The transition between two separate cameras can result in missing a photo which cannot be recaptured. The dual and multi-camera mount embodiments disclosed allow the user to move only a few inches between cameras and change the shooting hand between the cameras to be used. The transition requires only one hand to go between the cameras. Sports photographers have missed many shots as the play changed and have not had an option for a quick transition between multiple cameras. Disclosed embodiments also allow the user to use both a still and a video camera at the same time with the direction of the capture remaining substantially the same.

Certain support brackets have been developed to mount two cameras simultaneously. For example, both U.S. Pat. No. 4,272,177 to Ottenheimer (1981) and U.S. Pat. No. 4,514,067 to Gallegos and Salazar (1985) show support brackets for dual cameras.

However, while these brackets allow the user to operate both cameras, they both lack substantial support and protection for the cameras. The preferred embodiment disclosed corrects this problem by surrounding the lower camera body with a solid frame and by placing the upper camera at a distance a few inches behind the lower camera body. In the event of impact, the upper camera is protected by the bracket's mounting frame and the user. In the same instance, the lower camera is protected by the thick frame which absorbs impact and protects the camera body.

Another drawback of previously disclosed dual mount camera brackets is that they are typically not designed to allow a multitude of lenses to be used simultaneously. Moreover, traditional dual mount camera brackets rely upon attachments to the user's body to generate stability. This can be uncomfortable for the user because it causes stress around the neck, shoulders and back. If taking photographs or video for a long period of time, this will fatigue the user. Additionally, traditional dual mount camera brackets provide less stability as the camera angle will change as the user attempts to compensate for fatigue.

SUMMARY

Disclosed embodiments relate to camera support brackets, specifically a camera mount system that includes brackets arranged and designed for more than one camera. Embodiments include brackets that allow the user to mount multiple cameras on the same bracket and quickly change between multiple cameras. Embodiments correct problems identified above, such as not allowing a multitude of lenses to be used simultaneously, by allowing the user to mount a longer lensed camera in the lower section and a shorter lensed camera in the upper section. With the positioning of the upper camera to the back, it provides a near perfect weight balance for the user. Additionally, embodiments allow the user to take two photographs using two different cameras and camera setups without significantly changing the shot angle. This saves precious seconds. In high intensity environments like sports photography, those seconds may allow the user to capture a photograph that would have otherwise been lost. Disclosed embodiments address other problems, such as fatigue and lack of stability, by providing near perfect weight balance for the user. Additionally, rather than requiring the user to support the weight of the support bracket and cameras, the disclosed preferred embodiment is designed to be attached to a unipod, monopod, tripod, or other mounting device. Disclosed embodiments address these problems by providing substantial support, protecting the camera devices from impact, allowing the user to rapidly switch between devices without changing the camera angle, and not relying on the user's body for support. Many embodiments are described and/or illustrated for example purposes and are not limited by the figures of the accompanying drawings.

These and other advantages may be achieved by a camera support bracket that includes a mounting frame and a mounting arm. The mounting frame may include a substantially closed loop having an upper portion, lower portion, and two opposing side portions, and in which the mounting frame includes mounting holes arranged to mount a first camera within the interior of the mounting frame. The mounting arm may be configured to attach to the mounting frame and provide an attachment point for a second camera.

DETAILED DESCRIPTION

Figure 1:
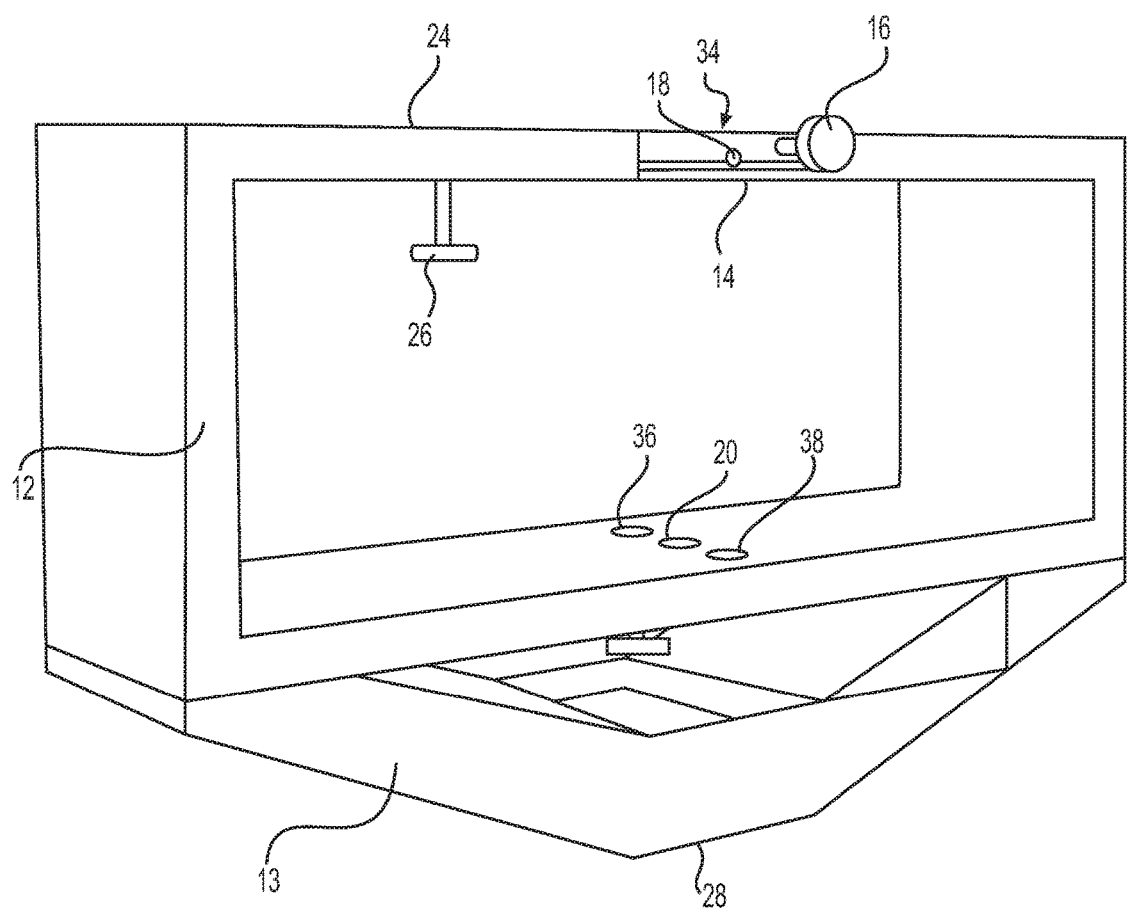
FIG. 1 is a perspective view of the fully assembled dual camera support bracket of the present invention.
Figure 2:
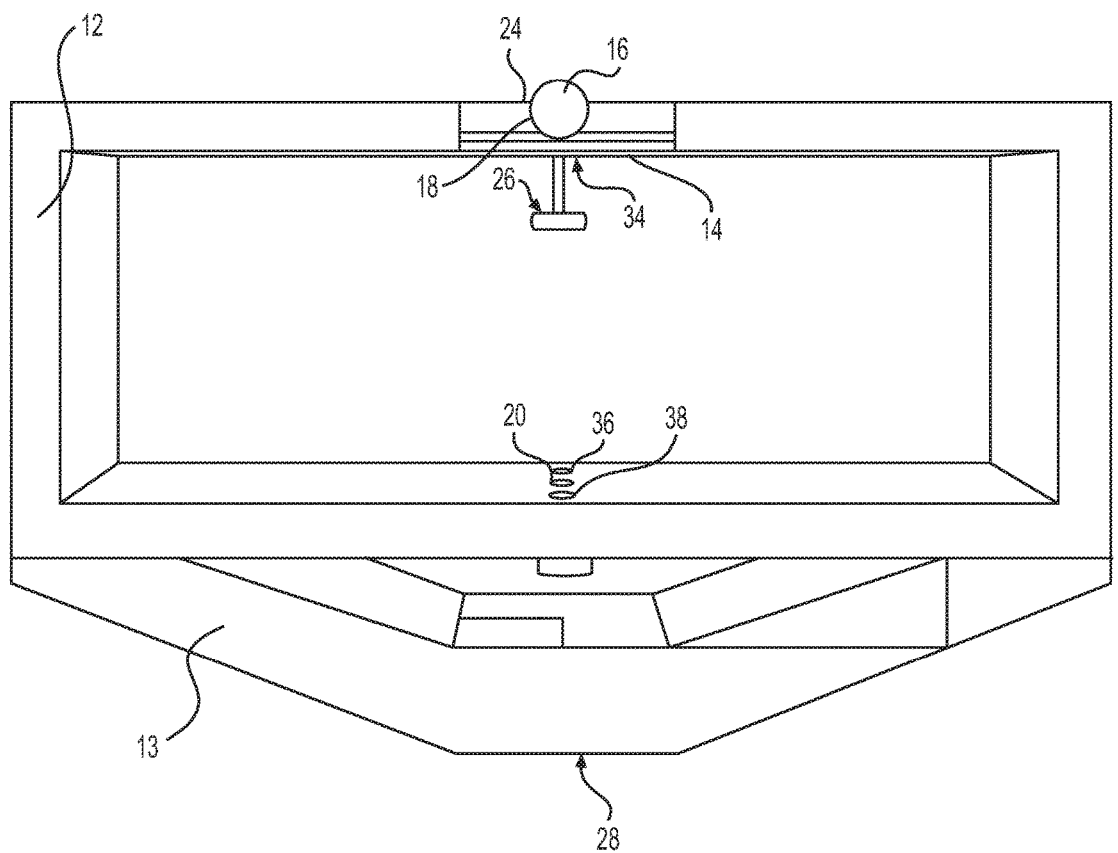
FIG. 2 is a front view of the fully assembled dual camera support bracket of FIG. 1.
Figure 3:
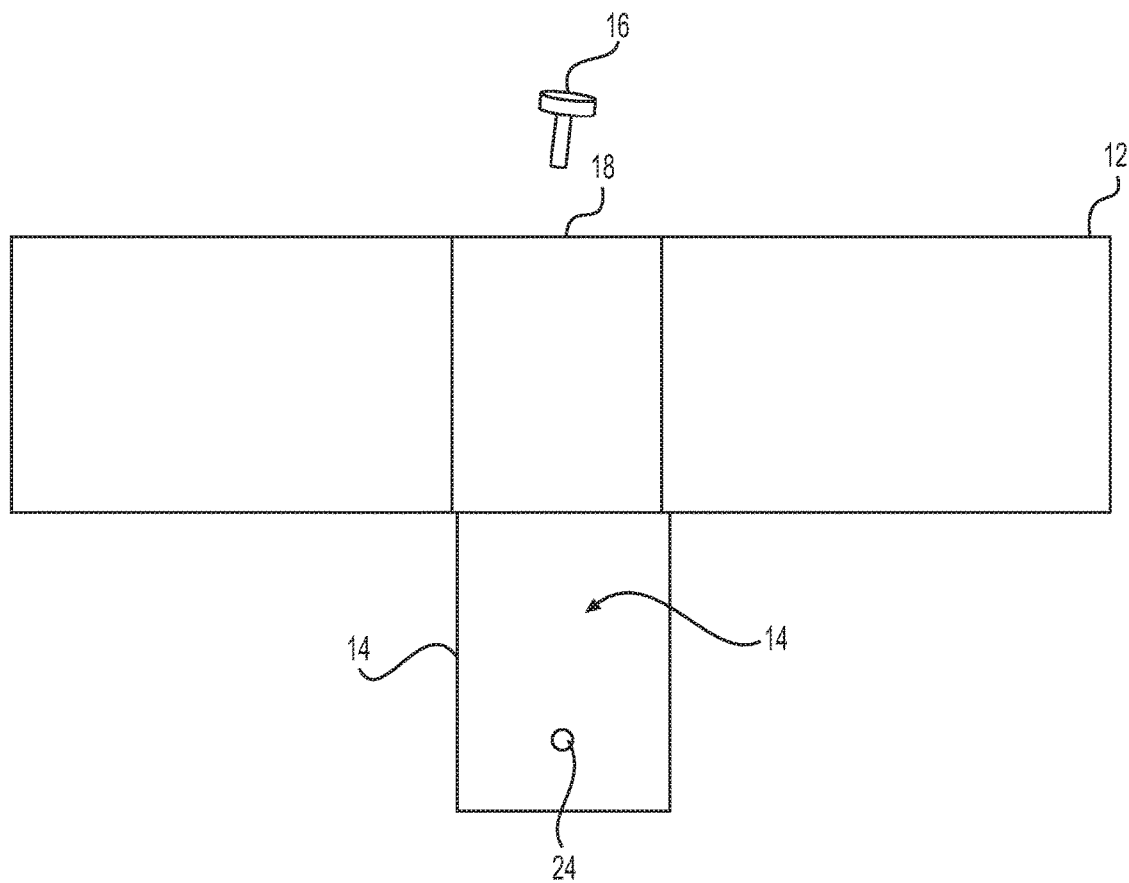
FIG. 3 is a top view of the fully assembled dual camera support bracket of FIG. 1.
Figure 4:
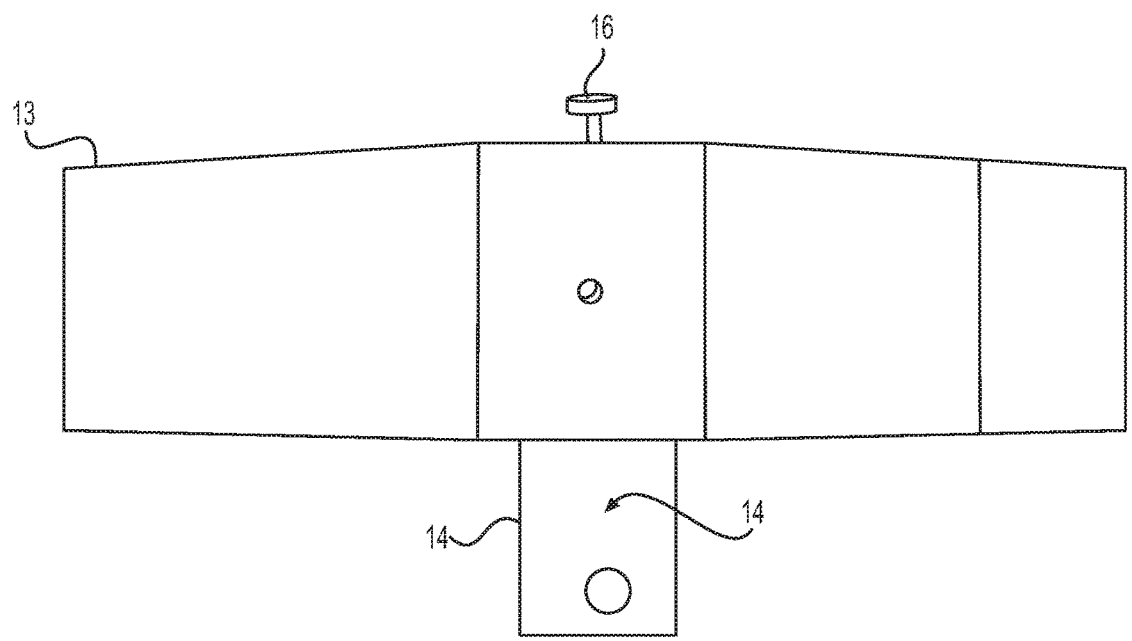
FIG. 4 is a bottom view of the fully assembled dual camera support bracket of FIG. 1.
Figure 5:
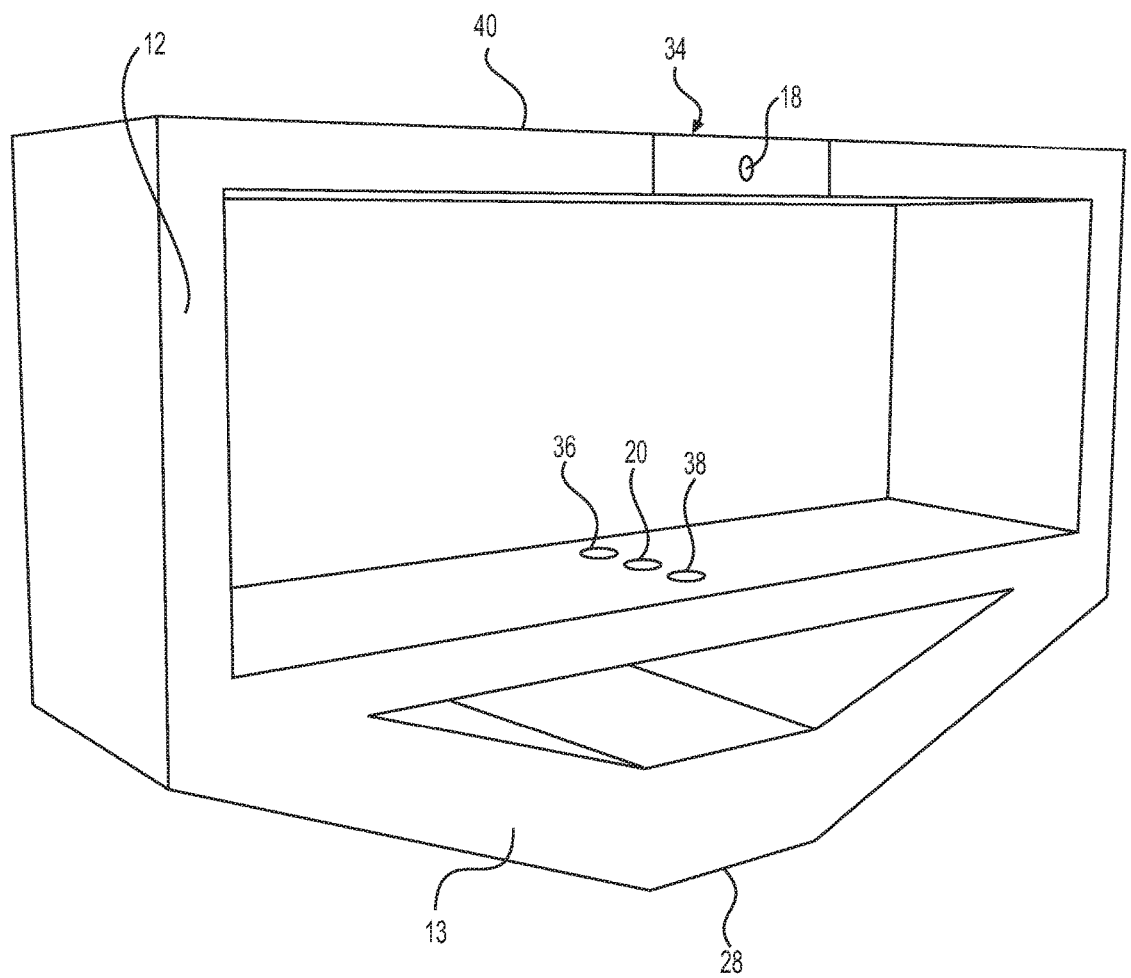
FIG. 5 is a perspective view of the mounting frame section of the present invention.
Figure 6:
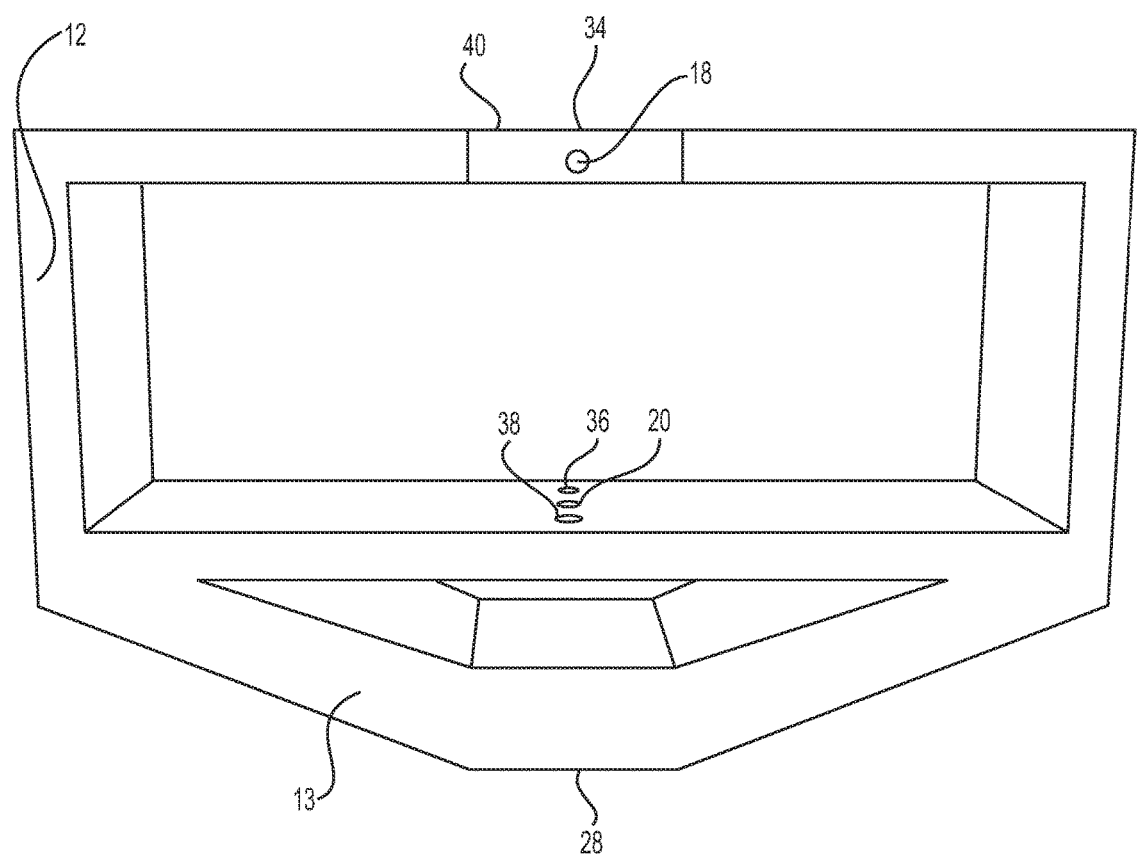
FIG. 6 is a front view of the mounting frame section of FIG. 5.
Figure 7:
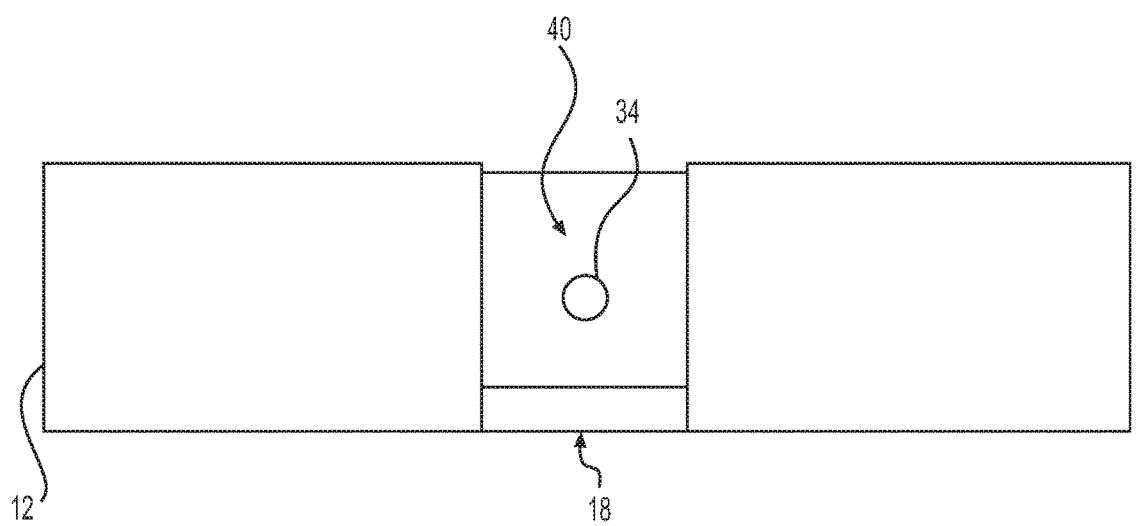
FIG. 7 is a top view of the mounting frame section of FIG. 5.
Figure 8:
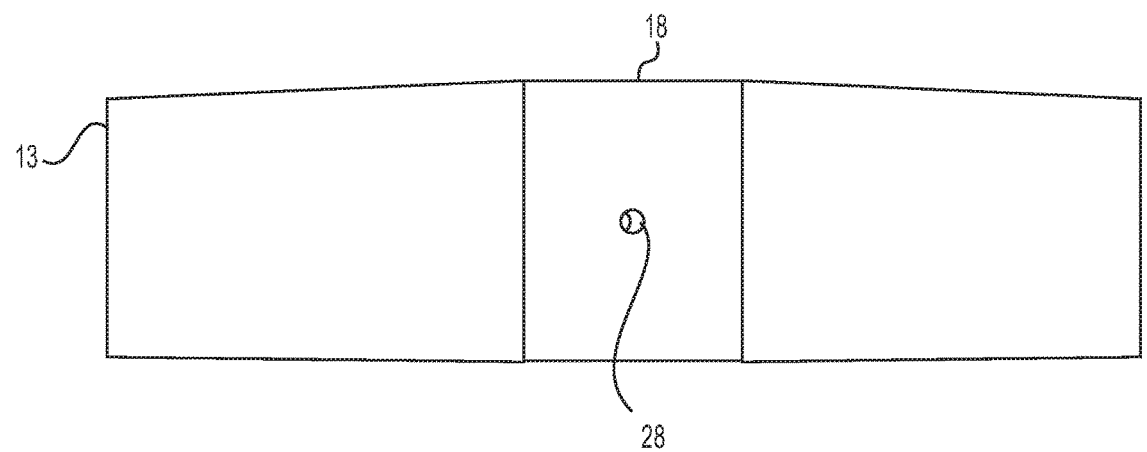
FIG. 8 is a bottom view of the mounting frame section of FIG. 5.
Figure 9:
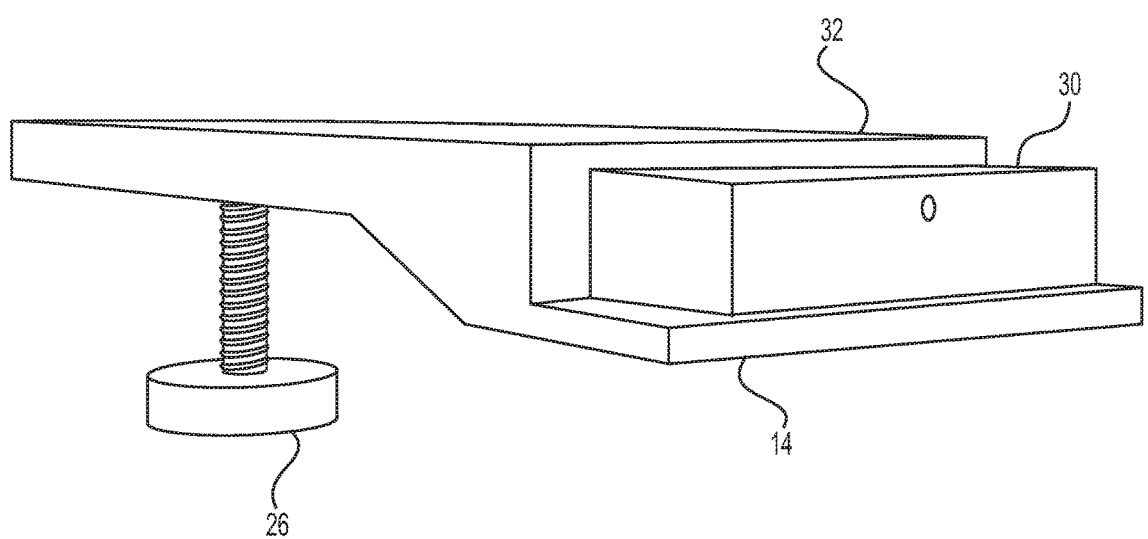
FIG. 9 is a perspective view of the mounting arm section of the present invention.
Figure 10:
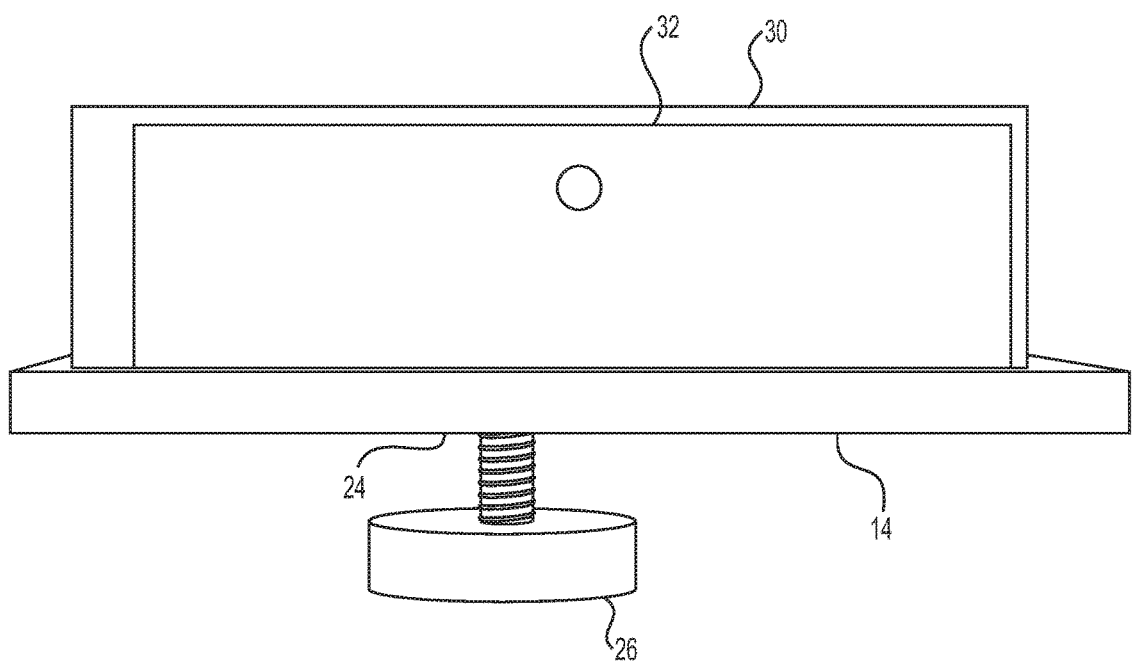
FIG. 10 is a front view of the mounting arm section of FIG. 9.
Figure 11:
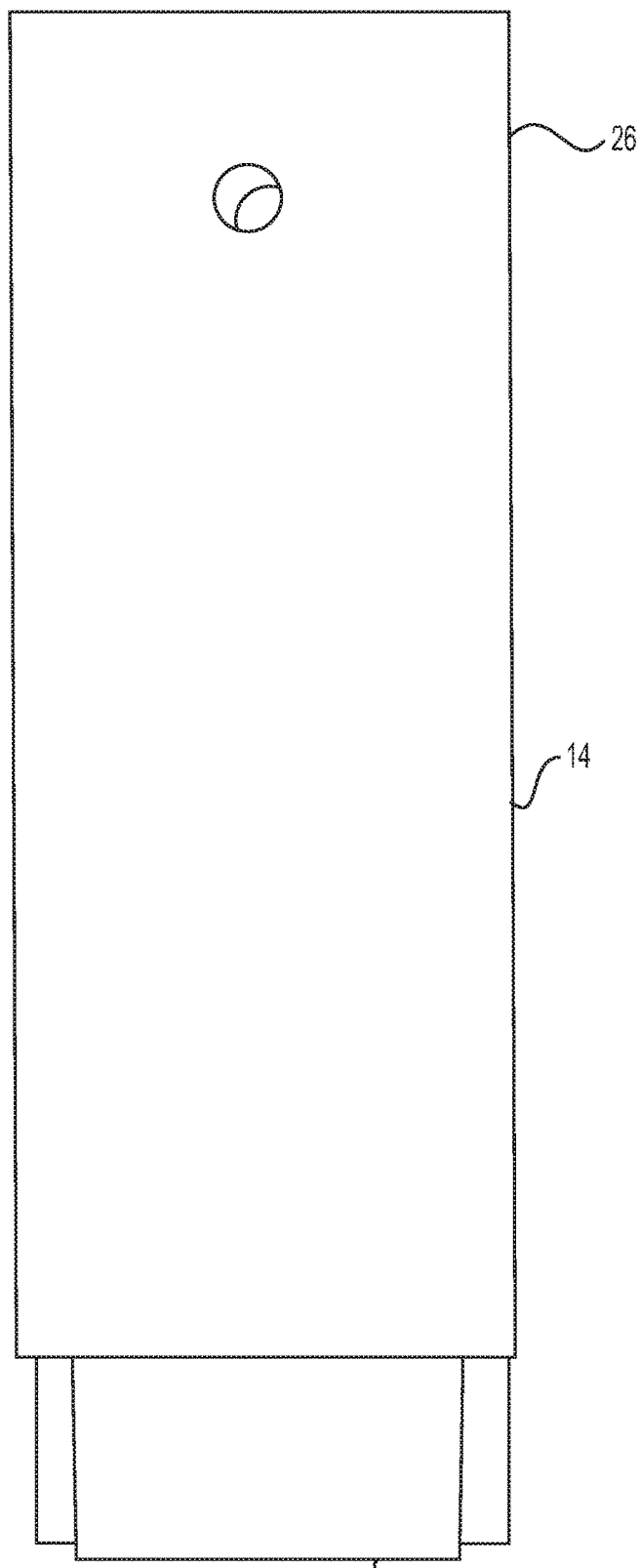
FIG. 11 is a top view of the mounting arm section of FIG. 9.
Figure 12:
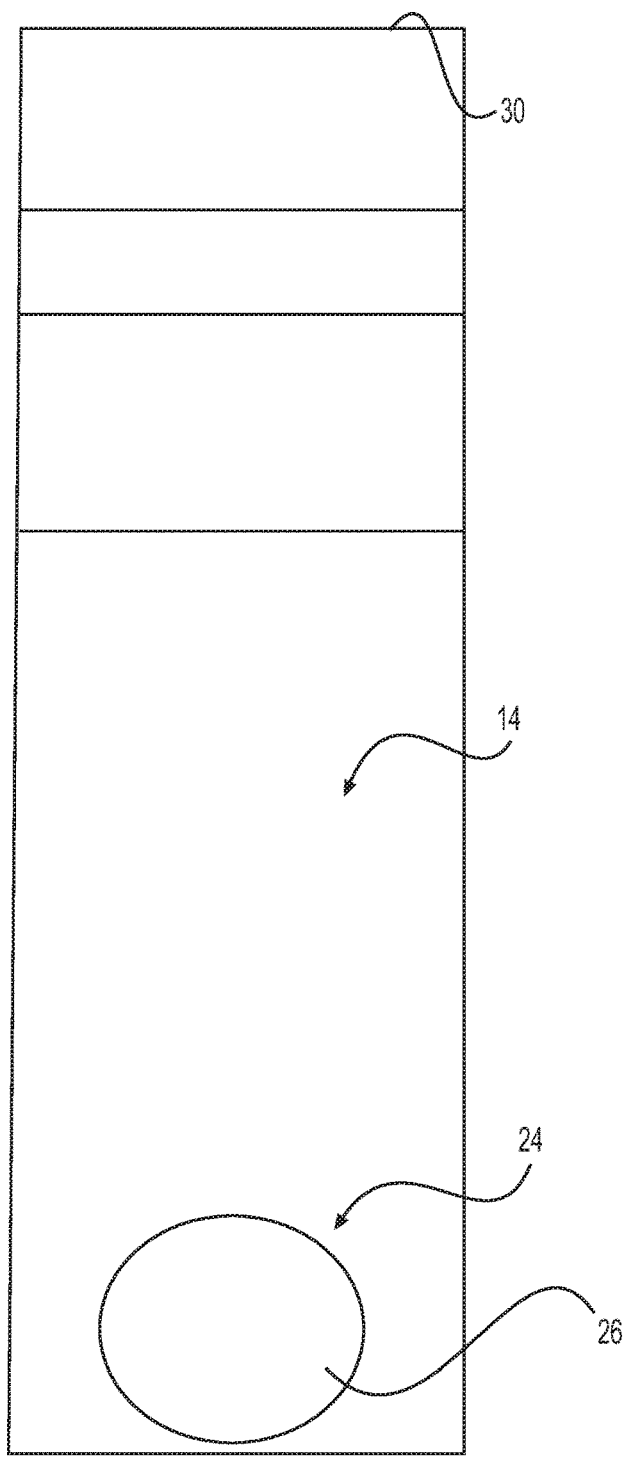
FIG. 12 is a bottom view of the mounting arm section of FIG. 9.

The terminology used herein is for the purpose of describing particular embodiments only and is not intended to be limiting. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, components, and/or groups thereof and do not limit or preclude the presence of any unstated features.

Unless otherwise defined, all terms (including technical and scientific terms) used herein have the same meaning as commonly understood by one having ordinary skill in the field of camera support brackets and mounting devices. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques, elements, and steps are disclosed. Each of these has individual benefit and each can also be used in conjunction with one or more, or in some cases all, of the other disclosed techniques, elements, and/or steps. Accordingly, for the sake of clarity, this description will refrain from repeating every possible combination of the individual techniques, elements, or steps in an unnecessary fashion. Nevertheless, the specification and claims should be read with the understanding that such combinations are entirely within the scope of the disclosure and the claims.

Dual and multi camera support brackets, mounting devices, and methods for simultaneous use of two or more cameras are discussed herein. In the following description, for purposes of explanation, numerous specific details are set forth in order to provide a thorough understanding. It will be evident, however, to one skilled in the art that the disclosed embodiments may be practiced with or without these specific details.

The present disclosure is to be considered an exemplification, and is not intended to limit the invention to the specific embodiments illustrated by the figures or expressly described below.

Referring now to the embodiments depicted in FIGS. 1 through 4, there is shown a dual camera support bracket 10 formed by a mounting frame 12 connected with a mounting arm 14. Mounting frame 12 and mounting arm 14 are connected by mounting screw 16 inserted into mounting hole 18. Attachment hole 34 in mounting frame 12 is used for mounting an upper camera when a shorter version of mounting arm 14 is used. In some embodiments, attachment hole 24 of mounting arm 14 aligns with attachment hole 34 in mounting frame 12. Attachment hole 20, attachment hole 36, attachment hole 38 and attachment screw 22 allow a user to mount a lower camera to dual camera support bracket 10. Attachment hole 24 and attachment screw 26 mount an upper camera to dual camera support bracket 10. In some embodiments, attachment hole 24 is actually a slot which allows a user to slide the camera back and forth in order to determine a preferred mounting location before tightening attachment screw 26. On the bottom of dual camera support bracket 10, attachment hole 28 allows a user to attach dual camera support bracket 10 to a tripod, uni-pod, monopod or other accessory.

In further detail, still referring to the invention in FIGS. 1 through 4, dual camera support bracket 10 is able to secure and position two cameras for simultaneous use. Mounting arm 14 is secured into mounting frame 12 by mounting screw 16 inserted and secured into mounting hole 18.

The construction details of the disclosed embodiments are that embodiments of dual camera support bracket 10 and its various components may be made of metals, polymers, alloys, fiberglass, composites or of any other rigid and strong material. The various components of dual camera support bracket 10 may be made of the same, similar, or different materials as compared to each other.

While mounting frame 12 is depicted as a complex shape, in certain embodiments, mounting frame 12 may be a closed loop with an upper portion, lower portion, and two opposing side portions. In many embodiments, mounting frame 12 will be generally rectangular. In many embodiments, mounting frame 12 will define an interior space surrounded by mounting frame 12. In these embodiments, a camera mounted within the interior space of mounting frame 12 will be generally protected from impact by mounting frame 12.

Referring now to the embodiments disclosed in FIGS. 5 through 8, there is shown an embodiment of mounting frame 12. Also shown is mounting hole 18 to allow for the mounting of mounting arm 14, and mounting slotting platform 40 where mounting arm 14 will slot into mounting frame 12. Also shown is attachment hole 34 which is used to attach an upper camera when using a short version of mounting arm 14. Shown are attachment hole 20, attachment hole 36, and attachment hole 38 to mount a lower camera in a variety of positions, and attachment hole 28 which allows the user to attach mounting frame 12 to a tripod, monopod or other accessory.

In further detail, still referring to the embodiments disclosed in FIGS. 5 through 8, mounting frame 12 is shown. In certain embodiments, the widest point of mounting frame 12 is approximately 10" to 11" wide. In other embodiments, the widest point of mounting frame 12 may be about 2" wide, about 4" wide, about 6" wide, about 8" wide, or even wider. In certain embodiments, the height at the tallest point of mounting frame 12 is between 10" to 12". In other embodiments, the height of the tallest point of mounting frame 12 may be about 6" high, about 8" high, about 10" high, about 16" high or even higher. While the embodiments disclosed in FIGS. 5 through 8 show a trapezoidal mounting member 13 of mounting frame 12 as an integral feature, it should be noted that mounting frame 12 may be a single closed loop with or without depicted trapezoidal lower mounting member 13. It should be noted that mounting member 13, when present, need not be an integral component of mounting frame 12, but may be secured to mounting frame 12 using any method known in the art. Attachment hole 28 may be located in mounting member 13 as depicted in the figures, or may be located elsewhere on mounting frame 12.

Referring now to FIGS. 9 through 12, there is shown a mounting arm 14. Depicted are attachment hole 24 and attachment screw 26 which may be used to mount an upper camera to mounting arm 14 of embodiments of the dual camera support bracket 10. Mounting arm joiner 32 allows mounting arm 14 to insert securely into mounting frame 12. On mounting arm joiner 32 is mounting hole 30 which allows mounting arm 14 to secure to mounting frame 12 by aligning with mounting hole 18 and mounting screw 16. This depicted embodiment allows mounting screw 16 to either thread through, or simply pass through mounting hole 18 and form a threaded connection with mounting hole 30.

In further detail, still referring to the embodiments depicted in FIGS. 9 through 12, mounting arm 14 is approximately 3" in width and varies in length from 1½" to 14" depending on application. In other embodiments, mounting arm 14 may be approximately 1" wide, approximately 2" wide, approximately 4" wide, approximately 6" wide, or even wider. In other embodiments, mounting arm 14 may also be approximately 1" long, approximately 3" long, approximately 6" long, approximately 8" long, approximately 10" long, approximately 12" long, or even longer. Mounting arm joiner 32 is approximately 2" wide and approximately 1.5" in length although any configuration of mounting arm joiner 32 may be appropriate as long as it allows for a secure connection of the mounting arm 14 to mounting frame 12.

Figure 13:
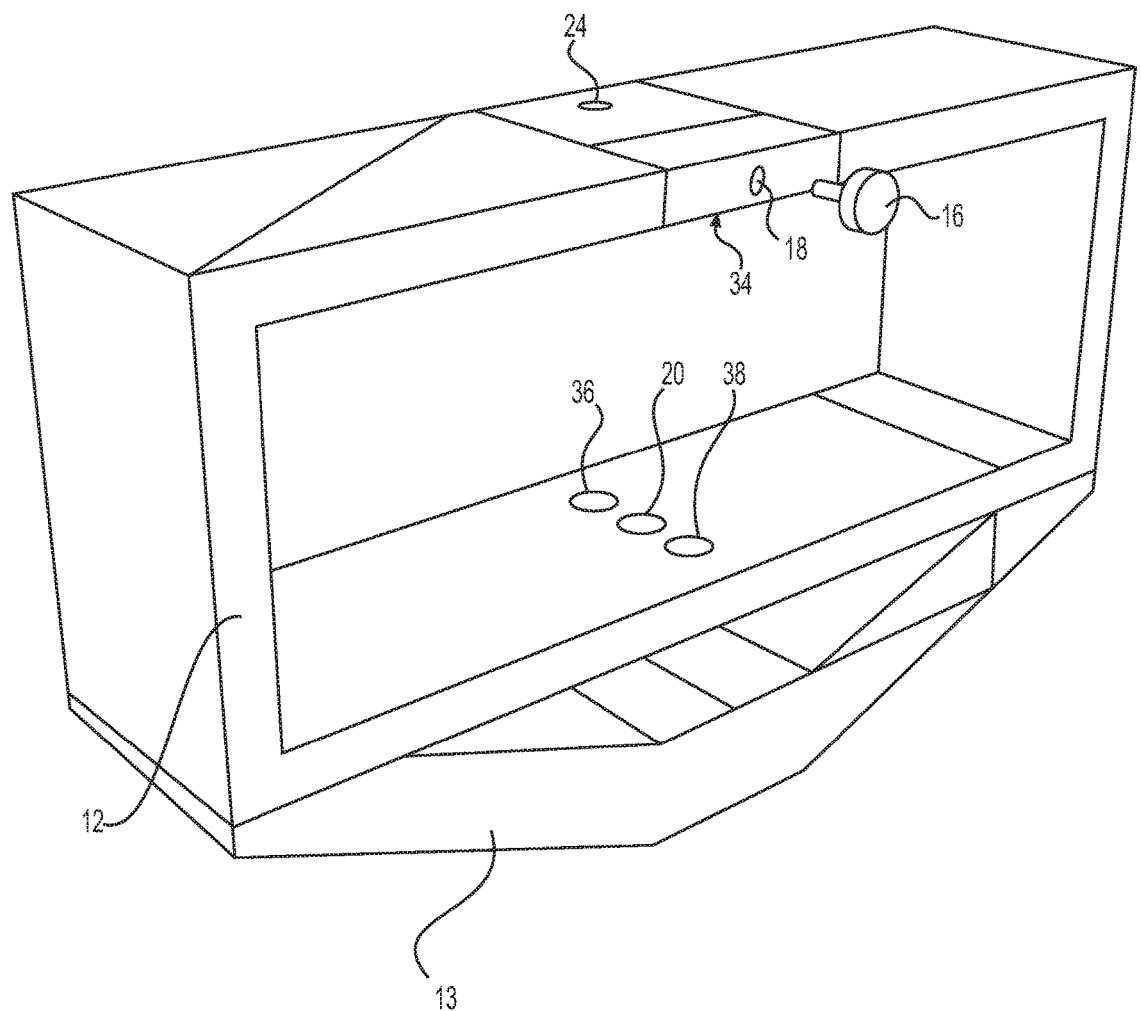
FIG. 13 is a perspective view of the fully assembled dual camera support bracket using the smallest version of the mounting arm of the present invention.
Figure 14:
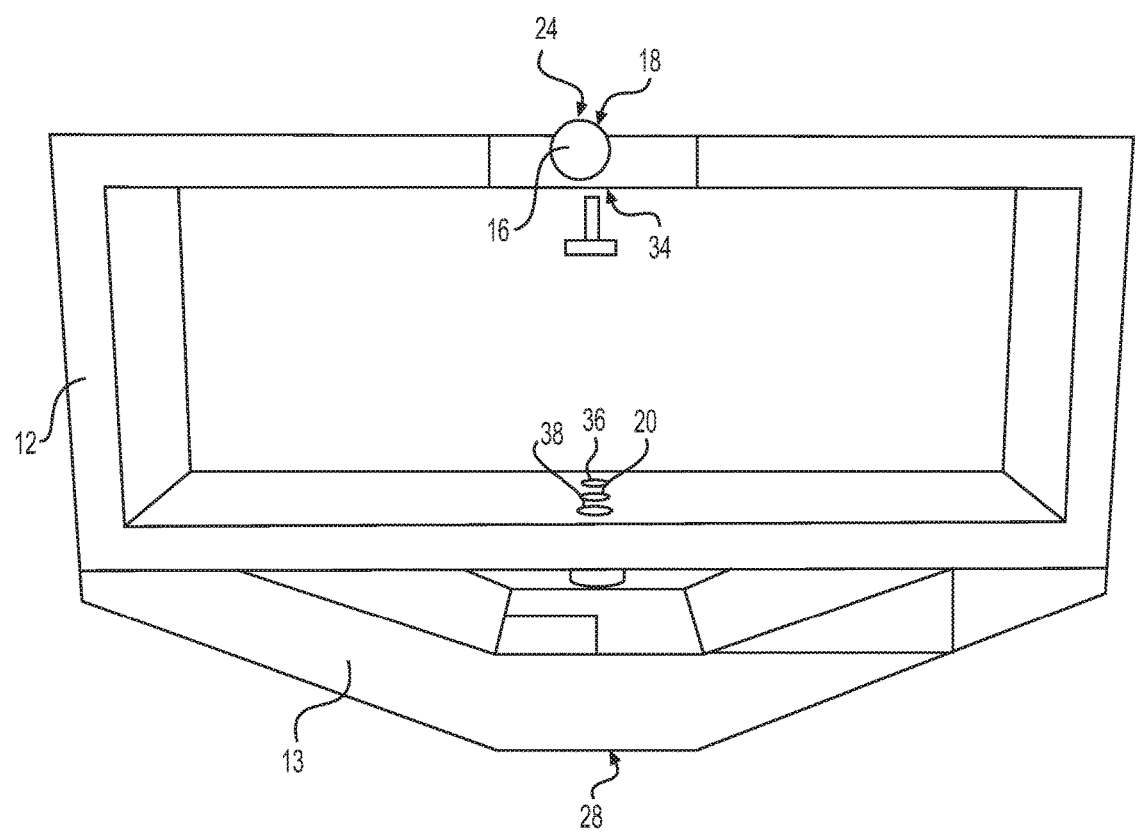
FIG. 14 is a front view of the fully assembled dual camera support bracket using the smallest version of the mounting arm of FIG. 13.

Referring now to the embodiments depicted in FIGS. 13 to 14, there is shown a dual camera support bracket 10 formed by a mounting frame 12 connected with a short version of mounting arm 14. Mounting frame 12 and mounting arm 14 are connected by mounting screw 16 inserted into mounting hole 18 and mounting hole 30. Attachment hole 34 is used for mounting an upper camera when the shorter version of mounting arm 14 is used. Attachment hole 24 and attachment screw 26 mount an upper camera to mounting arm 14 and, as a result, to dual camera support bracket 10. In some embodiments, when using a short version of mounting arm 14, attachment screw 26 will enter attachment hole 34 and attachment hole 24 to secure an upper camera to dual camera support bracket 10. Attachment hole 20, attachment hole 36, attachment hole 38 and attachment screw 22 allow a user to mount a lower camera to dual camera support bracket 10. On the bottom, attachment hole 28 allows the user to attach dual camera support bracket 10 to a tripod, monopod or other accessory.

Figure 15:
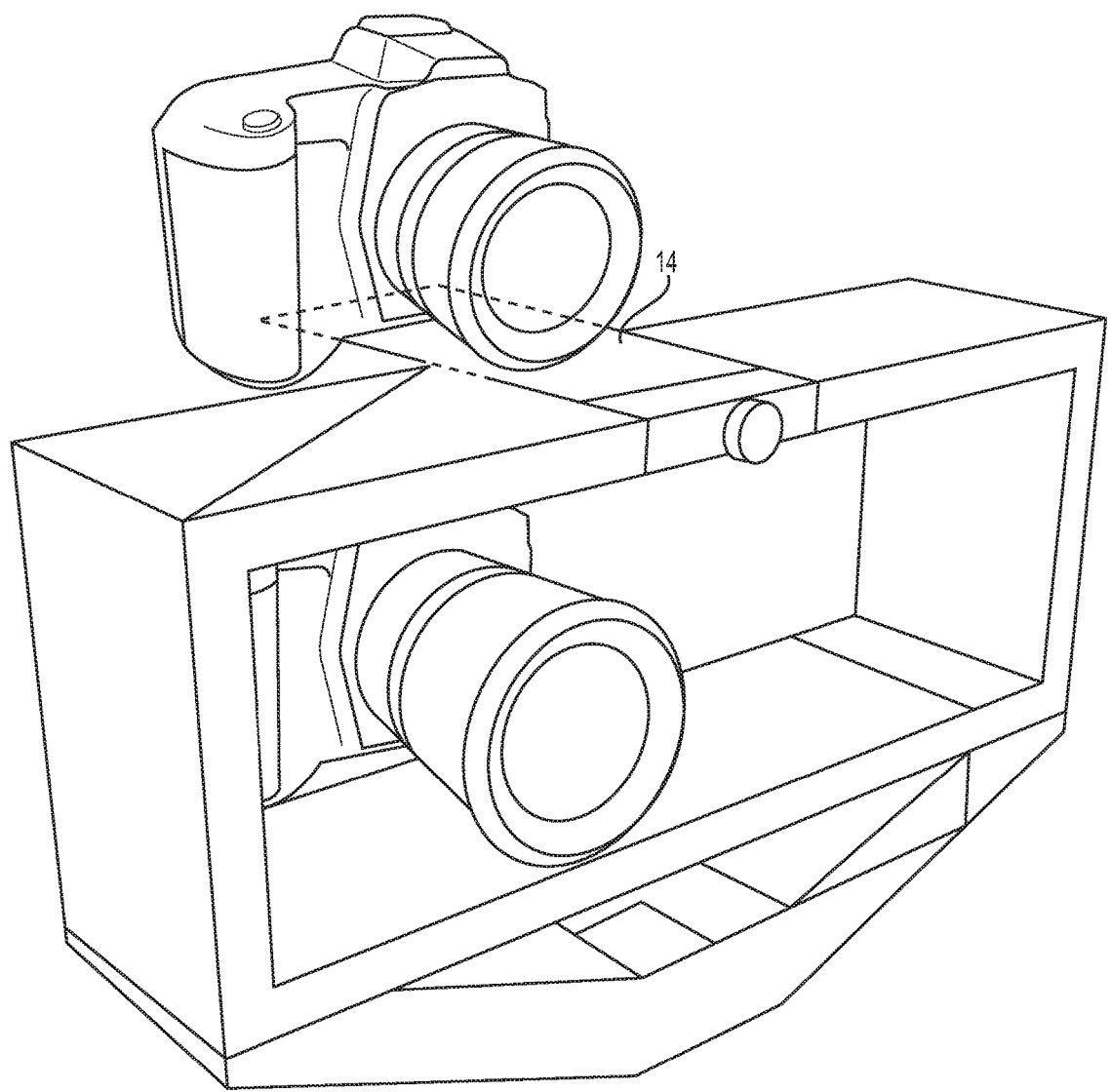
FIG. 15 is a perspective view of the fully assembled dual camera support bracket with two cameras included as an example of use of the present invention.
Figure 16:
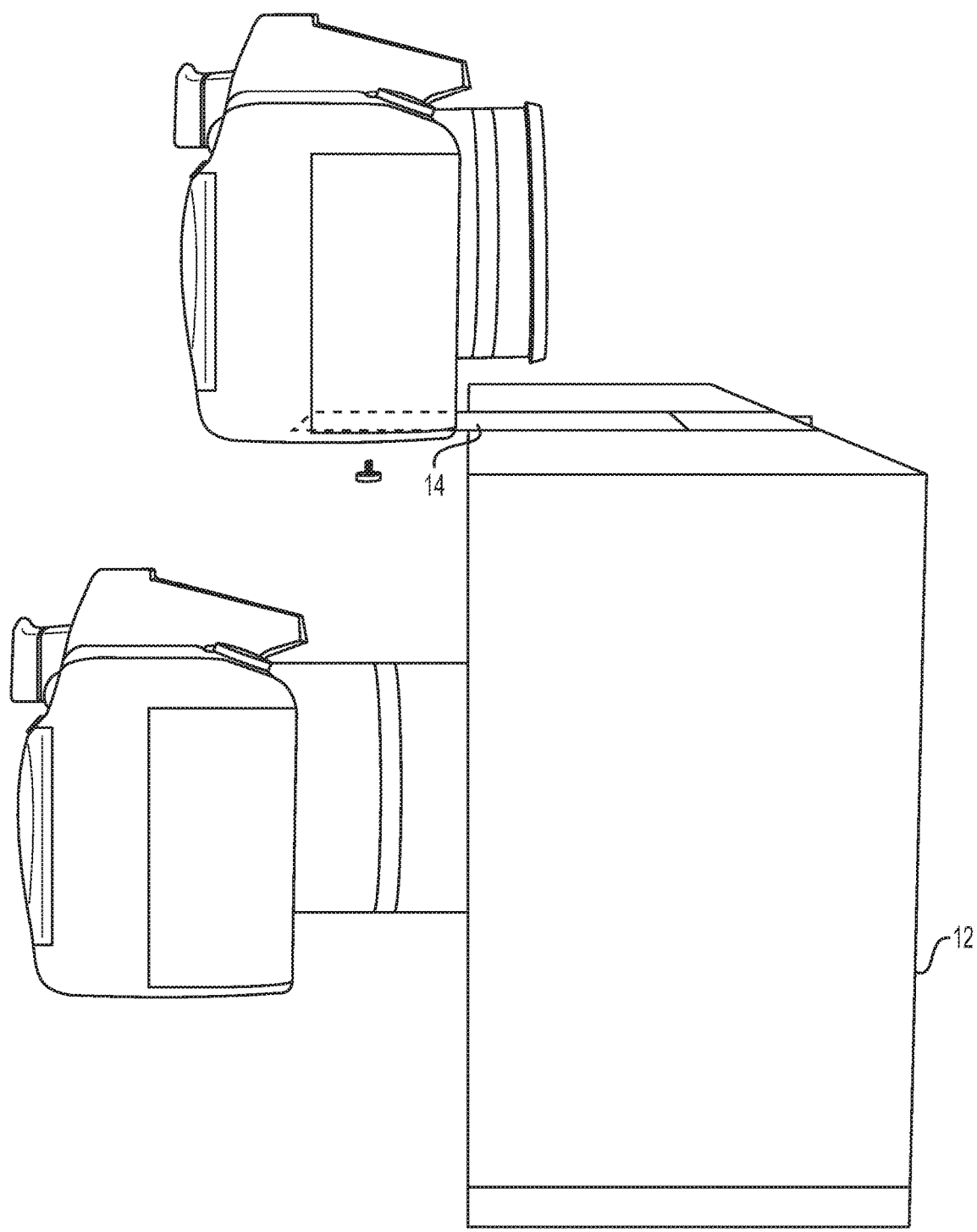
FIG. 16 is a side view of the fully assembled dual camera support bracket with two cameras included as an example of use.
Figure 17:
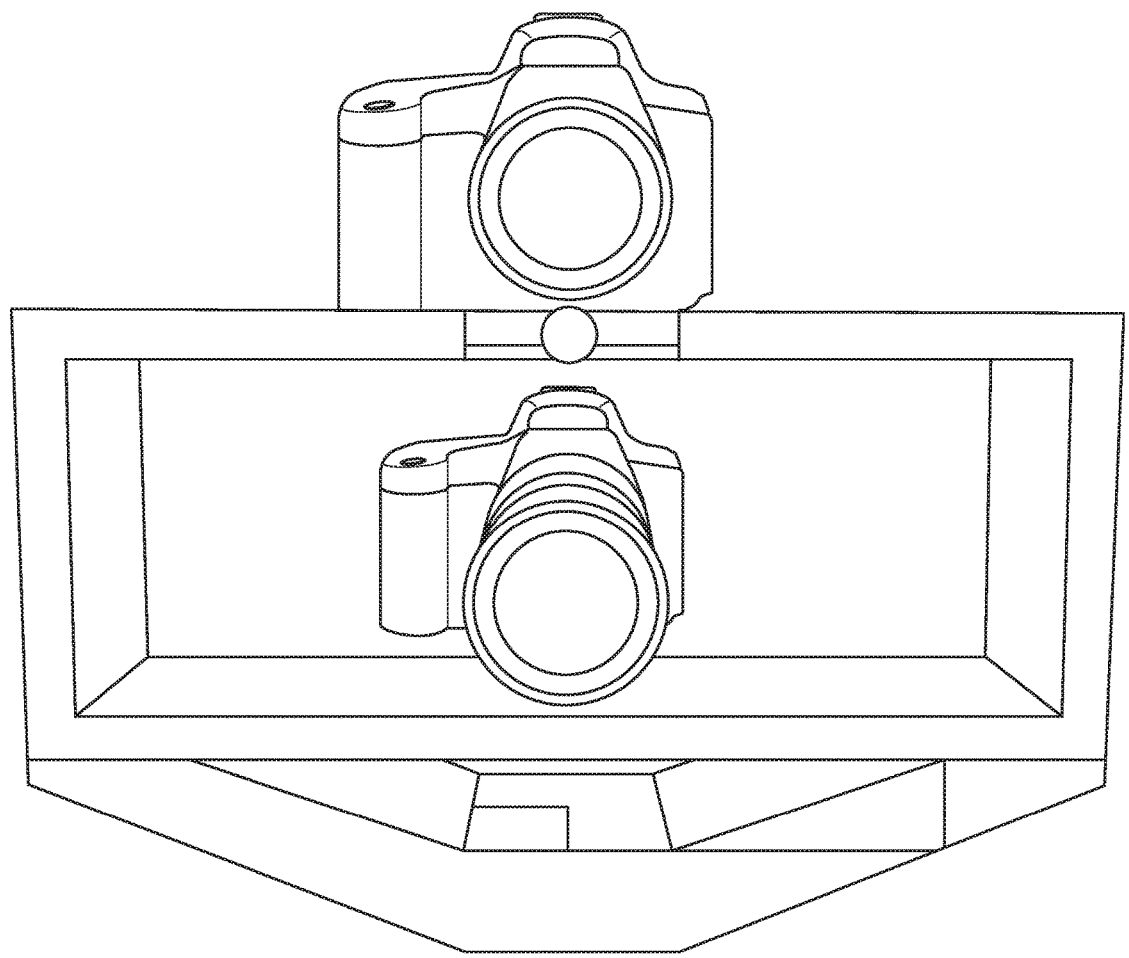
FIG. 17 is a front view of the fully assembled dual camera support bracket with two cameras included as an example of use.

Referring now to the embodiments disclosed in FIGS. 15 through 17, there is shown a fully assembled embodiment with two cameras mounted to dual camera support bracket 10.

Additional embodiments may also include a lower or side mounting extensions. These extensions may function similarly to the disclosed mounting arm 14 but will be attached to the lower portion or side portions of mounting frame 12. Lower and/or side mounting extensions may be used to provide additional attachments points for large camera lenses or additional cameras. For example purposes only, a side mounting extension may be attached to mounting frame 12 so that an iPhone, GoPro, or other camera or video camera device may be mounted in order to capture video and/or images from a third camera device.

In various embodiments, all of the described mounting and/or attachment holes may be replaced with mounting and/or attachment slots which allow the user to customize the precise location of the attached components prior to securing the components by tightening the corresponding mounting and/or attachment screw.

While disclosed embodiments are substantially composed of ridged materials, each component or portions of each component may be coated with rubber, silicone, vinyl, paint, textured materials, or other non-structural coatings in order to increase the comfort of the user, increase the durability of the components, or to improve the attachment of various components.

Advantages of the various embodiments may include, without limitation, the ability to simultaneously shoot from two devices without changing the angle of the shot. Rather than switching between cameras slung around the user's neck, in some embodiments, the user can move a single finger only a few inches to take the shot. Further, certain disclosed embodiments provide protection to the lower camera. Additionally, certain disclosed embodiments do not rely upon mounting the support bracket directly or indirectly to the user. When the bracket is not mounted to the user, the user's range of motion and comfort may be increased.

Disclosed embodiments relate to a camera support bracket comprising a mounting frame wherein the mounting frame comprises a substantially closed loop having an upper portion, lower portion, and two opposing side portions, and wherein the mounting frame includes mounting holes arranged to mount a first camera within the interior of the mounting frame; and a mounting arm, wherein the mounting arm is configured to attach to the mounting frame and provide an attachment point for a second camera. In some embodiments the mounting frame is further configured to be attached to a mounting device. In certain embodiments the mounting device may be a tripod, monopod, uni-pod, or other accessory. In some embodiments, the mounting arm is configured to attach to the upper portion of the mounting frame. In other embodiments, the mounting frame is comprised of substantially a single ridged piece of material. In certain embodiments, the mounting arm is configured such that the attachment point of the second camera is a slot which allows the second camera to attach to the mounting arm in a variety of locations. In other embodiments, the mounting frame is made of polymer. Certain embodiments may further comprise a lower mounting extension, wherein the lower mounting extension is configured to attach to the lower portion of the frame, or may further comprise a side mounting extension, wherein the side mounting extension is configured to attach to the mounting frame and provide a mounting point for a third camera. In some embodiments, the mounting frame is between about 10 inches and 12 inches wide. In other embodiments, the mounting arm is between about 4 inches and 8 inches long.

While the foregoing written description and figures depicting the disclosed embodiments enables one of ordinary skill to make and use what is currently considered to be the preferred embodiment, those of ordinary skill will understand and appreciate the existence of variations, combinations, and equivalents of the specific embodiments, and examples herein.

What is claimed is:

1. A camera support bracket comprising:
   a mounting frame wherein the mounting frame comprises
      a substantially closed loop having an upper portion, lower portion, and two opposing side portions, and wherein the mounting frame includes mounting holes arranged to mount a first camera within the interior of the mounting frame; and a mounting arm, wherein the mounting arm is configured to attach to the mounting frame and provide an attachment point for a second camera, the mounting arm is configured to extend beyond an edge of the mounting frame, and the mounting frame includes a mounting slotting platform through which the mounting arm slots into the mounting frame.

2. The bracket of claim 1, wherein the mounting frame is further configured to be attached to a mounting device.

3. The bracket of claim 2, wherein the mounting device is a tripod.

4. The bracket of claim 1, wherein the mounting arm is configured to attach to the upper portion of the mounting frame.

5. The bracket of claim 1, wherein the mounting frame is comprised of substantially a single ridged piece of material.

6. The bracket of claim 1, wherein the mounting arm is configured such that the attachment point of the second camera is a slot which allows the second camera to attach to the mounting arm in a variety of locations.

7. The bracket of claim 1, wherein the mounting frame is made of polymer.

8. The bracket of claim 1, further comprising a lower mounting extension, wherein the lower mounting extension is configured to attach to the lower portion of the frame.

9. The bracket of claim 1, further comprising a side mounting extension, wherein the side mounting extension is configured to attach to the mounting frame and provide a mounting point for a third camera.

10. The bracket of claim 1, wherein the mounting frame is between about 10 inches and 12 inches wide.

11. The bracket of claim 1, wherein the mounting arm is between about 4 inches and 8 inches long.

12. The bracket of claim 1, wherein an upper surface of the mounting arm is at the same level as an upper surface of the mounting frame.

13. The bracket of claim 1, wherein a front surface of the mounting frame includes an attachment point through which the mounting arm is attached to the mounting frame.

14. The bracket of claim 1, further comprising a mounting arm joiner attached to the mounting arm, wherein the mounting arm is attached to the mounting frame through the mounting arm joiner.

* * * * *